United States Patent
Mueller et al.

(10) Patent No.: US 10,361,617 B2
(45) Date of Patent: Jul. 23, 2019

(54) MAGNETIC COUPLING DEVICE FOR TRANSMITTING ROTATIONAL MOTIONS WITHOUT CONTACT

(71) Applicant: Mahle International GmbH, Stuttgart (DE)

(72) Inventors: Rolf Mueller, Steinheim/Murr (DE); Thomas Riemay, Korb (DE); Peter Wieske, Korntal-Muenchingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/529,989

(22) PCT Filed: Nov. 6, 2015

(86) PCT No.: PCT/EP2015/075899
§ 371 (c)(1),
(2) Date: May 25, 2017

(87) PCT Pub. No.: WO2016/083096
PCT Pub. Date: Jun. 2, 2016

(65) Prior Publication Data
US 2017/0317573 A1 Nov. 2, 2017

(30) Foreign Application Priority Data
Nov. 26, 2014 (DE) .................. 10 2014 224 151

(51) Int. Cl.
*H02K 49/00* (2006.01)
*H02K 49/10* (2006.01)
*H02K 5/128* (2006.01)

(52) U.S. Cl.
CPC ......... *H02K 49/106* (2013.01); *H02K 49/102* (2013.01); *H02K 5/128* (2013.01)

(58) Field of Classification Search
CPC .... H02K 49/106; H02K 49/104; H02K 5/128; H02K 16/02; H02K 49/102; H02K 49/10; H02K 1/274; H02K 1/2753
(Continued)

(56) References Cited

U.S. PATENT DOCUMENTS

| | | | |
|---|---|---|---|
| 4,381,466 A * | 4/1983 | Laenens | H02K 49/106 310/103 |
| 4,869,654 A | 9/1989 | Klaus | |

(Continued)

FOREIGN PATENT DOCUMENTS

| DE | 3012740 A1 | 10/1981 |
|---|---|---|
| DE | 3715484 A1 | 11/1988 |

(Continued)

OTHER PUBLICATIONS

EIP0034992 English Translation.*
(Continued)

*Primary Examiner* — Bernard Rojas
*Assistant Examiner* — Maged M Almawri
(74) *Attorney, Agent, or Firm* — Fishman Stewart PLLCx

(57) ABSTRACT

A device for transmitting rotational motions without contact may include an inner rotor with at least one inner-rotor magnet and an outer rotor with at least one outer-rotor magnet. The inner rotor and the outer rotor are magnetically coupled to one another and rotatable along a rotation direction about a common axis of rotation. The at least one inner-rotor magnet and/or the at least one outer-rotor magnet may have a magnetization that is at least one of diametric, radial, and lateral. The at least one inner-rotor magnet may have a different type of magnetization than the at least one outer-rotor magnet.

19 Claims, 4 Drawing Sheets

(58) Field of Classification Search
USPC ............. 310/103, 104, 156, 156.01, 156.43, 310/156.55, 266
See application file for complete search history.

(56) References Cited

U.S. PATENT DOCUMENTS

| | | | | |
|---|---|---|---|---|
| 5,204,572 | A * | 4/1993 | Ferreira | H02K 49/106 310/156.19 |
| 5,283,495 | A * | 2/1994 | Wendel | H01F 7/145 251/129.11 |
| 5,691,586 | A * | 11/1997 | Yonnet | G01F 1/075 310/103 |
| 7,549,205 | B2 * | 6/2009 | Shafer | H02K 49/106 29/446 |
| 8,358,044 | B2 | 1/2013 | Waszak et al. | |
| 9,593,753 | B2 * | 3/2017 | Davey | H02K 49/102 |
| 2004/0066107 | A1 * | 4/2004 | Gery | H02K 49/106 310/103 |
| 2008/0218007 | A1 * | 9/2008 | Masuzawa | H01F 1/0578 310/44 |
| 2012/0293031 | A1 * | 11/2012 | Atkins | H02K 49/102 310/104 |
| 2014/0210292 | A1 * | 7/2014 | Martinek | G01D 5/145 310/156.01 |

FOREIGN PATENT DOCUMENTS

| | | | |
|---|---|---|---|
| DE | 4446915 | A1 | 7/1996 |
| EP | 0034992 | A1 * | 9/1981 ........... H02K 49/106 |
| EP | 0512516 | A1 | 11/1992 |
| EP | 1239572 | A2 | 9/2002 |
| EP | 2395635 | A1 | 12/2011 |
| EP | 2565375 | A2 | 3/2013 |
| JP | H04261354 | A | 9/1992 |

OTHER PUBLICATIONS

English abstract for EP-2395635.
Zonnet J-P: "A New Type of Permanent Magnet Coupling", IEEEE Transactions on Magnetics, vol. Mag-17, No. 6, Nov. 1981.
English abstract for DE-4446915.
English abstract for EP-1239572.

* cited by examiner

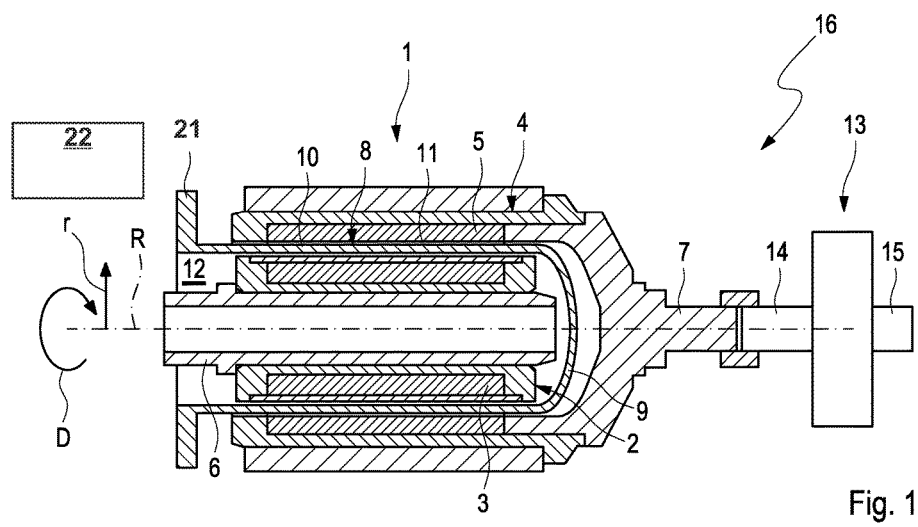
Fig. 1
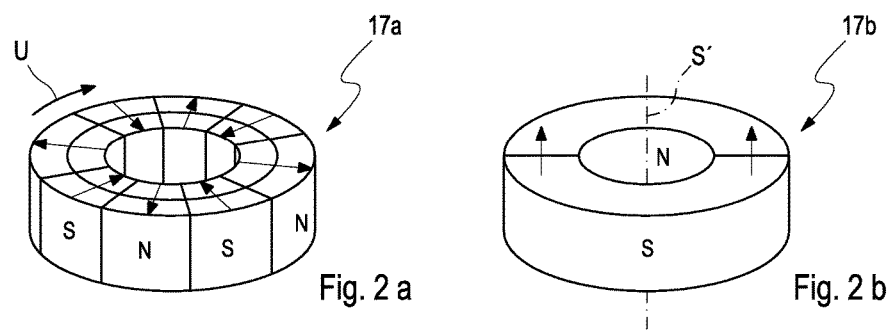
Fig. 2 a
Fig. 2 b
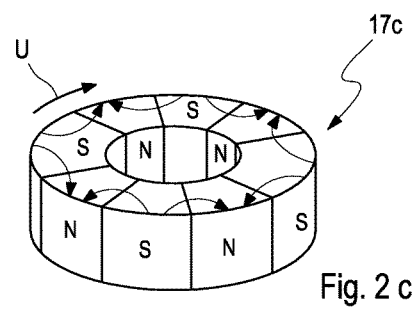
Fig. 2 c

MAGNETIC COUPLING DEVICE FOR TRANSMITTING ROTATIONAL MOTIONS WITHOUT CONTACT

CROSS-REFERENCE TO RELATED APPLICATIONS

This application claims priority to German Patent Application No. 10 2014 224 151.0 filed on Nov. 26, 2014, and International Patent Application No. PCT/EP2015/075899, filed on Nov. 6, 2015, the contents of which are hereby incorporated by reference in their entirety.

TECHNICAL FIELD

The invention relates to a device for transmitting rotational motions without contact and a drive system comprising such a device.

BACKGROUND

Devices for transmitting rotational motions without contact can, for example, be configured as couplings whose function is based on the action of a magnetic field; in drive technology these are designated as magnetic field couplings. These magnetic couplings are used according to the prior art to transmit torques without contact via an air gap and through walls, possibly of hermetically sealed containers. Magnetic couplings are therefore frequently used in flow machines such as gas turbines, for example, but also in fluid pumps. Such a magnetic coupling comprises an outer rotor fitted with magnets in each case, which together with an inner rotor also fitted with magnets is rotationally adjustable about a common axis of rotation. The inner rotor is in this case coupled to a drive shaft, the outer rotor is coupled to a drive shaft or conversely. The desired transmission of the torque from the inner rotor to the outer rotor is accomplished by means of the magnetic interaction of the magnets of the inner rotor with those of the outer rotor.

According to the prior art, for practical manufacturing considerations, conventional magnetic couplings typically use magnetizable or magnetic materials for magnetic field generation, which statically produce the magnetic exciter field required for torque transmission without an electrical current flow being required for this purpose. It is popular to use various ferromagnetic materials such as iron, cobalt or nickel. The use of rare earth metals such as, for example, neodymium alloyed with iron and boron as well as samarium cobalt and samarium iron is also familiar to the relevant person skilled in the art.

Against this background, EP 1 239 572 A2 describes a device for contactless transmission of rotational movements, specifically a magnetic coupling, which has two magnetic coupling members which are mechanically decoupled from one another by a gap. The magnetic coupling members comprise two segmented polarized magnets which are each attached directly to the front-side mutually facing ends of means transmitting the rotational movement.

In conventional magnetic couplings, the effective magnetic coupling of the magnets of the inner rotor with those of the outer rotor proves to be problematical since this depends to a considerable extent on the profile of the magnetic field lines produced by the magnets. In this connection, the person skilled in the art is familiar with different forms of magnetization with which the individual magnets of the two rotors can be provided and which can differ appreciably from one another with regard to the alignment of the field lines of the magnetic field generated by them. In drive technology, magnetic components are usually installed which are characterized by a so-called radial and by a so-called diametric magnetization. Alternatively the use of magnets with lateral magnetization also comes into consideration which is also familiar to the person skilled in the art under the term "Halbach magnetization".

However, the usual use in the prior art of exclusively one of these three said types of magnetization in a magnetic coupling results in considerable disadvantages in the coupling of motion of the inner rotor to the outer rotor. For example, an exclusive use of magnets with diametric magnetization in the magnetic field produced by the outer rotor results in magnetic field lines which as a result of their orientation relative to the inner rotor contribute only partially to the transmission of torque between the two rotors. This results in a not inconsiderable reduction in the degree of coupling or torque transmission of the magnetic coupling.

It is therefore the object of the invention to provide a device for transmitting rotational motions without contact which is characterized by an improved magnetic coupling. A further object of the invention consists in supplementing a drive system with such a device for transmitting rotational motions without contact.

The said object are solved by the subject matter of the independent patent claim(s). Preferred embodiments are the subject matter of the dependent claims.

SUMMARY

The basic idea of the invention is accordingly to use in the inner rotor of the magnetic coupling magnetic components having a different type of magnetization than in the magnetic components of the outer rotor. A magnetic coupling according to the invention may therefore possibly be provided in the outer rotor with magnets having radial magnetization which is characterized by a profile of the magnetic field lines radially to the axis of rotation of the coupling or radially away from this and may be provided in the inner rotor with magnets having diametric magnetization which is characterized in contrast by a parallel profile of the field lines in a plane perpendicular to the axis of rotation. The resulting magnetic field proves to be particularly suitable for a highly effective transmission of torque between inner and outer rotor. In contrast, the use of magnets of identical type of magnetization in the inner and outer rotor in the magnetic coupling according to the invention is expressly not provided. Naturally combinations of different types of magnetization other than those mentioned as an example above are also feasible which will be discussed hereinafter with reference to specific preferred embodiments of the magnetic coupling presented here.

As already mentioned, it proves to be particularly advantageous for an effective coupling of the magnetic fields of inner and outer rotor to provide the inner-rotor magnets with a diametric magnetization and the outer-rotor with a radial magnetization.

According to an alternative embodiment, the inner-rotor magnet can be provided with a diametric magnetization but the outer-rotor magnet can be provided with a lateral magnetization. This design approach makes it possible to dispense with a ground ring usually required on the outer rotor with other types of magnetization. Such a ground ring is usually necessary to increase and guide the circuit of the field lines produced in the magnetic dipole field. By dispensing with such a ground ring on the outer rotor, the constructive expenditure to produce the magnetic coupling according to the invention can be reduced to a not inconsiderable extent.

In a further alternative embodiment it is proposed to provide the inner-rotor magnet with a lateral magnetization and the outer-rotor magnet with a radial magnetization. This embodiment makes it possible to dispense with the ground ring usually required on the inner rotor with other types of magnetization so that if the design allows, a ferromagnetic sheet metal package and/or a shaft made of ferromagnetic material can also be dispensed with, i.e. the shaft can be made of a ceramic material for example if mechanically suitable.

The use of magnetic elements with radial magnetization opens up the possibility to the person skilled in the art of installing this in the magnetic coupling in the form of ring elements which are characterized by a significantly increased mechanical stability compared with magnetic components consisting of a plurality of components which are separate from one another, i.e. segmented. In addition, the number of production steps is reduced since instead of a plurality of segments, only one ring magnet has to be mounted.

In an advantageous further development, the outer-rotor magnet and/or the inner-rotor magnet can each be provided with at least two magnetic elements which are arranged adjacent to one another along the direction of rotation of the outer- or inner-rotor magnet. In the case of a diametric magnetization of the inner- or outer-rotor magnet, the respective directions of magnetization of two adjacent magnetic elements along the direction of rotation differ from one another. In the case of a radial magnetization of the at least one inner- or outer-rotor magnet, the direction of magnetization of a specific magnet extends in the radial direction away from the axis of rotation. On the other hand, both the respective adjacent magnet in the direction of rotation and also contrary to the direction of rotation has a direction of magnetization in the radial direction to the axis of rotation or conversely. Particularly preferred is an embodiment with six magnetic elements so that the directions of magnetization of two adjacent magnetic elements have a 60° angle with respect to one another.

For the angle $\alpha$ of the directions of magnetization of adjacent magnetic elements with respect to one another, in the case of a diametric magnetization preferably the following relationship applies: $\alpha=(180°/\text{number of pole pairs}) \pm 180°$. In an embodiment in which the rotor has four diametrically magnetized magnetic elements, the directions of magnetization therefore have an angle $\alpha$ of $\pm 90°$ with respect to one another.

Alternatively to this—in the case of the radial magnetization of the inner- or outer-rotor magnet described above—the respective directions of magnetization point towards the centre or away from the centre.

An embodiment in which the magnets of outer rotor and/or inner rotor are configured in the manner of a ring magnet proves to be mechanically particularly stable and therefore particularly suitable for permanent use in a magnetic coupling. The specific rotationally symmetrical geometry of such a ring magnet is particularly suitable for use in the outer- and inner rotor of a magnetic coupling but wear-promoting imbalances in the rotational movement of outer and inner rotor can be largely avoided by means of a ring magnet.

In order to optimize the field line profile of the magnetic field produced by outer and inner rotor, it is finally recommended to provide at least two pole pins between inner and outer rotor along the direction of rotation. This measure results in an improved coupling of outer and inner rotor. The number of pole pins required in the specific case of application is calculated according to the following relationship:

Number of pole pins=(outer rotor pole pairs+inner rotor pole pairs)/2.

An advantageous area of use for the magnetic coupling presented here is the use in a flow machine, possibly in the form of a gas turbine or a fluid pump. The magnetic coupling according to the invention can thus be used to transmit the torque produced by the flow machine on an output shaft to a drive shaft without contact. This approach allows the flow machine to be manufactured as a separate unit, whose output shaft usually has fluid driving the flow machine flowing around it due to the design, and allows it to be configured as a separate outwardly sealed component including its output shaft. The transfer of torque from the output shaft is accomplished by means of a an inner rotor of the magnetic coupling according to the invention arranged on the output shaft in a torque-proof manner, which is magnetically coupled in the manner according to the invention described above with an outer rotor which is in turn connected in a torque-proof manner to the drive shaft.

In order to be able to seal the flow machine including the output shaft fluidically against the remaining components of the magnetic coupling, a sealing body configured in the manner of a pot having a pot base and a pot collar can be provided, wherein the pot collar is then arranged radially between inner rotor and outer rotor. Said pot collar is therefore used for sealing the fluid driving the flow machine. For fastening the sealing body on the flow machine, it is possible to provide the pot collar of the sealing body with a radially outwardly projecting flange section axially at the end into which the sealing body goes over away from the pot base.

A particularly predestined area of application of the device according to the invention lies in the field of heat recovery from combustion waste gases (so-called WHR, "waste heat recovery") where it allows a replacement of the wear-prone and maintenance-intensive dynamic sliding ring seals by a static sealing cap between inner and outer rotor. In addition to the reliable sealing of the working fluid to be conveyed, possibly a suitable liquid, with respect to the pump drive connected mechanically to the outer rotor, a corresponding magnetic coupling pump is for example characterized by the additional advantage of a securing against any overload states which can be compensated by the slippage produced between magnetically connected inner and outer rotor.

Frequently the rotational speeds which occur in output shafts of modern flow machines are too high to be able to be used by the devices downstream of the flow machine. A suitable measure for reducing the rotational speed of the output shaft to a suitable value is the use of a transmission unit which must be fitted with a suitable transmission ratio for the desired reduction in the rotational speed. Such a transmission unit can also have a multistage structure if high transmission ratios, possibly of 10:1 or higher are to be achieved.

The invention finally relates to a drive system having the previously presented magnetic coupling as well as having a flow machine drive-connected to the output shaft of the magnetic coupling. The sealing body is fastened by means of the flange section on a housing of the flow machine.

Further important features and advantages of the invention are obtained from the subclaims, from the drawings and from the relevant description of the figures with reference to the drawings.

It is understood that the features mentioned previously and to be explained further hereinafter can be used not only in the respectively given combination but also in other combinations or alone without departing from the scope of the present invention.

Preferred exemplary embodiments of the invention are presented in the drawings and are explained in detail in the following description, where the same reference numbers relate to the same or similar or functionally the same components.

BRIEF DESCRIPTION OF THE DRAWINGS

In the figures, in each case schematically:

FIG. 1 shows an example of a device according to the invention for transmission of rotational motions without contact in a longitudinal section, FIGS. 2A to 2C show examples for various types of magnetization illustrated by means of a ring magnet.

DETAILED DESCRIPTION

Figure 3:
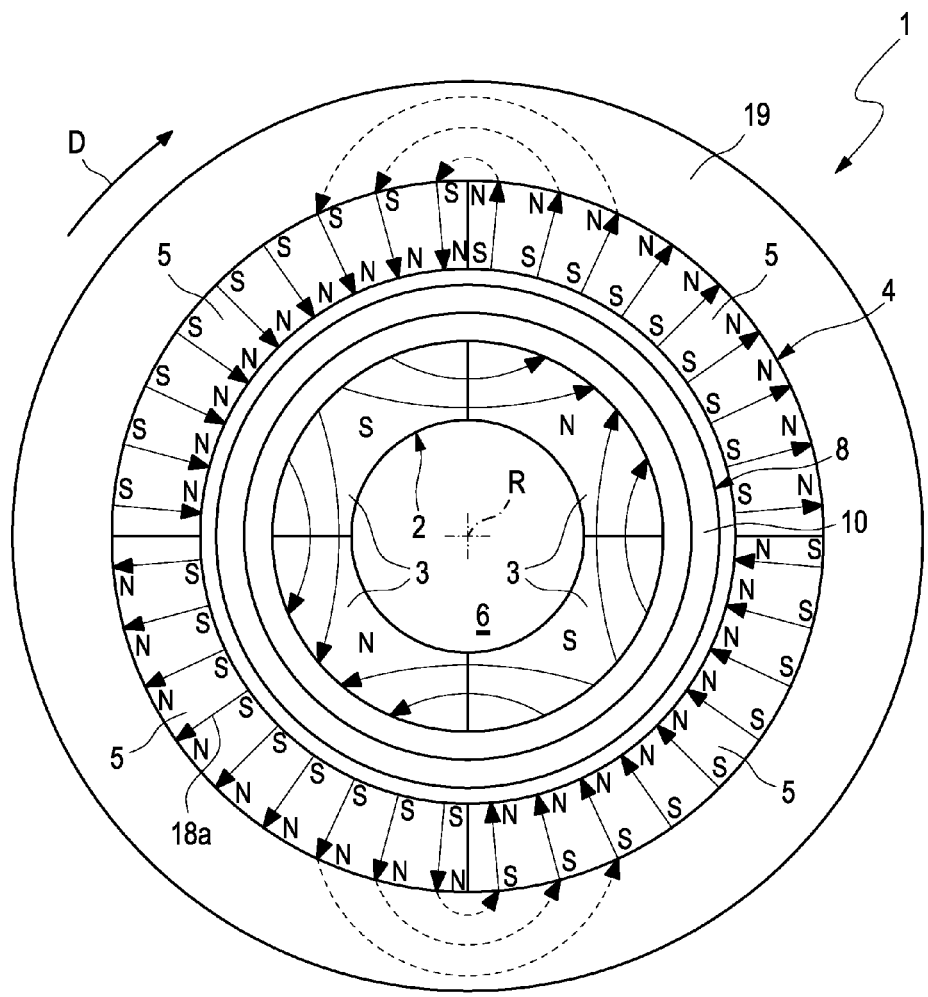
FIGS. 3A to 3C show various examples for devices according to the invention for transmission of rotational motions without contact with outer and inner rotor having different types of magnetization.
Figure 3:
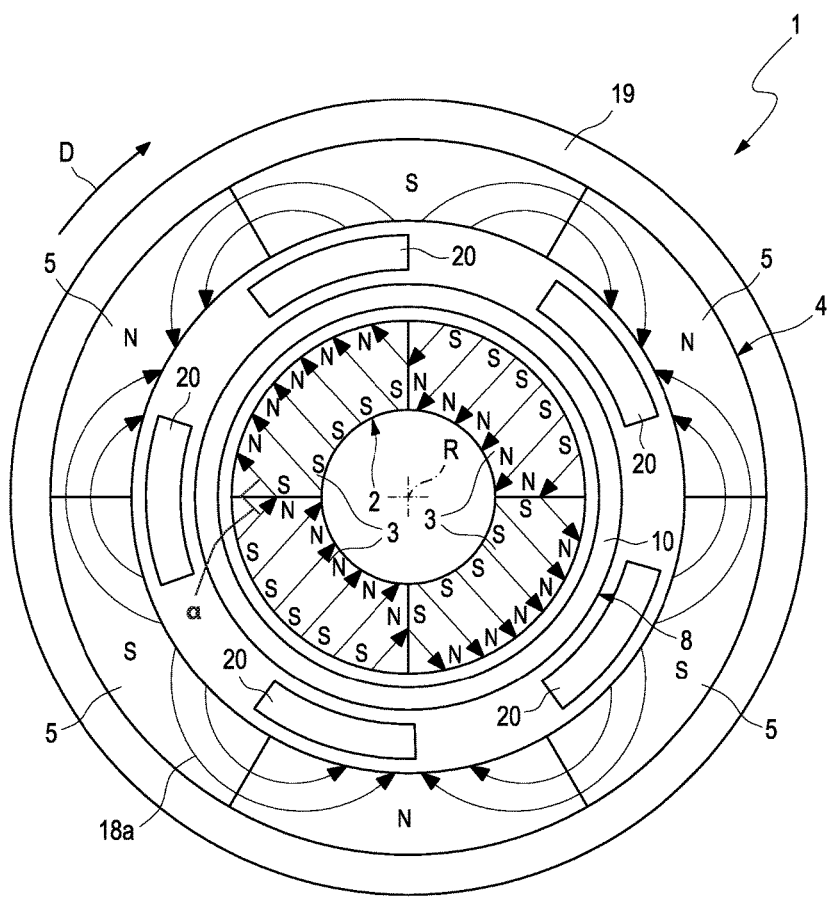
Figure 3:
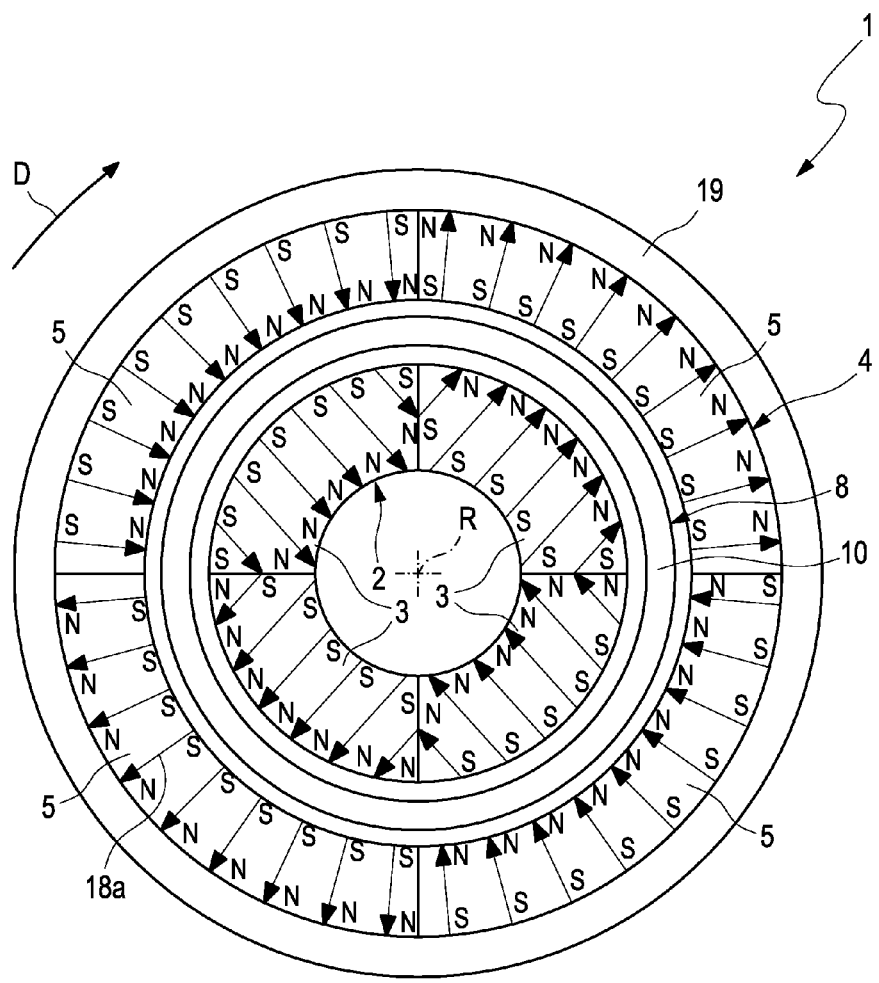

FIG. 1 illustrate roughly schematically and in a longitudinal section a device according to the invention, here configured as magnetic coupling 1, for transmission of rotational motions without contact. This comprises an inner rotor 2 having an inner-rotor magnet 3 and an outer rotor 4 which comprises at least one magnetic outer-rotor magnet 5 and which is magnetically coupled to the inner rotor 2. Inner rotor 2 and outer rotor 4 are rotationally adjustable about a common axis of rotation R.

The magnetic coupling 1 shown as an example in the example scenario may serve to transmit a torque produced by a flow machine 22, for example of a gas turbine or a fluid pump in an output shaft 6 to a drive shaft 7 for further use. For this purpose the output shaft 6 can be connected in a torque-proof manner to the inner rotor 2 and the drive shaft 7 can be connected in a torque-proof manner to the outer rotor 4 or conversely.

This approach allows the flow machine to be configured as a component separate from the actual magnetic coupling 1, possibly if the flow machine 22 is a gas turbine with blade wheels arranged in a torque-proof manner on the output shaft 6 so that said output shaft has fluid flowing around it due to the design.

In order to be able to seal the flow machine including the output shaft 6 fluidically towards the further components of the magnetic coupling 1, this comprises a sealing body 8 configured in the manner of a pot with a pot base 9 and a pot collar 10, wherein the pot collar 10 is arranged as shown in FIG. 1 in relation to a radial direction r of the magnetic coupling 1 in a gap 11 between outer rotor 4 and inner rotor 2. It can be deduced from the example scenario of FIG. 1 that the pot collar 10 goes over axially at the end into a radially outwardly protruding flange section 21 which can be fastened directly to a housing of the flow machine 22. Consequently a fluid can certainly flow around the region 12 around the output shaft 6 including the inner rotor 2 but the sealing body 8 seals this region outwards, i.e. towards the outer rotor 4.

Since the rotational speeds produced by flow machines in the output shaft 6 are frequently very high, it can be necessary to reduce these in order to be used by the devices downstream of the flow machine. A suitable measure in this case for reducing the rotational speed of the output shaft 6 to a suitable value is the use of a transmission unit 13 indicated only roughly schematically in FIG. 1 which has an input shaft 13 connected in a torque-proof manner to the drive shaft 7. Such a transmission unit 13 can have a multistage structure if high transmission ratios, possibly of 10:1 or higher are to be achieved. The reduced rotational speed compared with the input shaft 14 is provided at an output shaft 15. The transmission unit 13 together with the magnetic coupling 1 thus forms a magnetic transmission 16.

The respective magnetization of the inner-rotor and/or outer-rotor magnets 3, 5 arranged on the inner and outer rotor 2, 4 is crucial for the effective magnetic coupling of the outer rotor 4 to the inner rotor 2 and thus for effective transmission of torque from the inner rotor 2 to the outer rotor 4. In principle, three types of magnetization come into consideration for this in each case and specifically a radial, diametric or lateral magnetization. The profile of the magnetic field lines accompanying the respective type of magnetization is shown in the examples of FIGS. 2a to 2c. The ring magnet 17a shown in FIG. 2a with alternating magnetic poles S, N both in the circumferential direction U and in the radial direction—a magnetic south pole is designated by the letter "S" and a magnetic north pole is accordingly designated by "N"—generates a magnetic field with field lines extending alternately radially inwards or radially outwards in the circumferential direction U.

FIG. 2b shows in contrast a ring magnet 17b with diametric magnetization. The ring magnet 17b has for this purpose only one magnetic north pole and one magnetic south pole. In contrast to the magnetic field lines of the ring magnet 17a, those of the ring magnet 17b extend parallel to one another in a plane perpendicular to the axis of symmetry S' of the ring magnet 17b.

FIG. 2c finally shows a ring magnet 17c with magnetic north and south poles alternating along the direction of rotation D. Such an arrangement of the magnetic poles results in a so-called lateral magnetization which is known to the person skilled in the art under the term "Halbach magnetization".

Various examples of the magnetic coupling 1 according to the invention whose inner-rotor or outer-rotor magnets 2, 3 differ from one another in their respective type of magnetization will now be explained with reference to FIGS. 3a to 3c.

The example in FIG. 3a shows in a cross-section a magnetic coupling 1 having an outer rotor 4 on which four outer-rotor magnets 5 are fastened radially inwards, these being arranged along the direction of rotation D in such a manner that for the outer rotor 4 the radial magnetization shown in FIG. 2a is obtained with field lines 18a of the magnetic field running according in or contrary to the radial direction. Accordingly, four inner-rotor magnets 3 with likewise alternating polarity are provided on the inner rotor 2 along the direction of rotation and specifically in such a manner that a magnetic field having a field line profile corresponding to that of a lateral magnetization is obtained for the inner rotor 2. A ground ring 19 can be provided radially outwards on the outer rotor 4 by means of which the circuit (cf. dashed field lines in FIG. 3a) of the magnetic field lines 18a required with a magnetic dipole field can be produced. The arrangement with radial magnetization of the outer rotor 4 and lateral magnetization of the inner rotor 2 shown in FIG. 3a is characterized by a particularly good magnetic coupling of inner and outer rotor 2, 4 as a result of the resulting overall field line profile. The use of a radial magnetization on the outer rotor 4 additionally allows the constructively advantageous use of mechanically particularly stable ring magnets.

The same applies for the example of FIG. 3b which shows an outer rotor 4 with six outer-rotor magnets 5 with alternating magnetic polarity (N, S) arranged radially inwards along the direction of rotation D and adjacent to one another so that a lateral magnetization is obtained as a result. The field line profile accompanying such a lateral magnetization provides for an automatic circuit of the magnetic field lines on the outer rotor 4 which, compared with the example of FIG. 3a, makes the provision of a ground ring radially outwards on the outer motor 4 no longer necessary. The inner rotor 2 in the example of FIG. 3b is provided with a diametric magnetization. Four inner-rotor magnets 3 are attached to the inner rotor 2 in the direction of rotation D which each have in sections the typical parallel field line profile for a diametric magnetization. Two adjacent inner-rotor magnets 3 along the direction of rotation D have directions of magnetization which are arranged at an angle α of 90° with respect to one another. In addition, five pole pins 20 are arranged between inner and outer rotor 2, 4 along the direction of rotation D which serve to harmonize the field line profile between outer and inner rotor 4, 2. The pole pins 20 can be made of steel or sheet metal; according to one variant not shown in FIG. 2b, these can also be fastened directly to the outer rotor 4.

FIG. 3c finally illustrates a magnetic coupling 1 with a radial magnetization of the outer rotor 4 already explained with reference to the example of FIG. 3a whereas the inner rotor 2 has the diametric magnetization already described in connection with FIG. 3b.

The invention claimed is:

1. A device for transmitting rotational motions without contact, comprising:
   an inner rotor including at least one inner-rotor magnet;
   an outer rotor including at least one outer-rotor magnet and magnetically coupled to the inner rotor;
   the inner rotor and the outer rotor rotatable along a direction of rotation about a common axis of rotation;
   the at least one inner-rotor magnet having at least one of a diametric magnetization, a radial magnetization, and a lateral magnetization;
   the at least one inner-rotor magnet and the at least one outer-rotor magnet having different types of magnetization from one another;
   wherein the at least one inner-rotor magnet includes at least two inner-rotor magnets arranged along the direction of rotation on the inner rotor and the at least one outer-rotor magnet includes at least two outer-rotor magnets arranged along the direction of rotation on the outer rotor;
   wherein the at least two inner-rotor magnets and the at least two outer-rotor magnets each have a respective direction of magnetization that differ from one another;
   wherein the at least two inner-rotor magnets each have a diametric magnetization, and the at least two outer-rotor magnets each have a lateral magnetization; and
   wherein the at least two outer-rotor magnets include a plurality of single unitary outer-rotor magnets structured and arranged directly adjacent to one another with alternating polarity along the direction of rotation such that a magnetic south pole magnet of the plurality of single unitary outer-rotor magnets is disposed between and directly contacts two circumferentially adjacent magnetic north pole magnets of the plurality of single unitary outer-rotor magnets, and wherein the lateral magnetization of the plurality of single unitary outer-rotor magnets define magnetic field lines extending circumferentially to the common axis of rotation such that the magnetic field lines extend from the magnetic south pole magnet to the two circumferentially adjacent magnetic north pole magnets.

2. The device according to claim 1, wherein at least one of the at least one inner-rotor magnet and the at least one outer-rotor magnet is configured as a ring magnet.

3. The device according to claim 1, further comprising at least two pole pins arranged between the inner rotor and the outer rotor along the direction of rotation.

4. The device according to claim 1, wherein the at least two inner-rotor magnets with the diametric magnetization have a magnetic field line extending parallel to one another in a plane perpendicular to the common axis of rotation.

5. The device according to claim 1, further comprising a ground ring arranged radially outwards on the outer rotor.

6. The device according to claim 1, wherein the plurality of single unitary outer-rotor magnets respectively define a single pole.

7. The device according to claim 1, wherein the at least two inner-rotor magnets include a plurality of single unitary inner-rotor magnets structured and arranged directly adjacent to one another with alternating polarity along the direction of rotation such that a magnetic south pole end of each of the plurality of single unitary inner-rotor magnets is disposed between and directly contacts a magnetic north pole end of two circumferentially adjacent magnets of the plurality of single unitary inner-rotor magnets, and wherein the diametric magnetization of each of the plurality of single unitary inner-rotor magnets defines magnetic field lines extending parallel to one another in a plane perpendicular to the common axis of rotation.

8. The device according to claim 1, further comprising:
   a drive shaft connected in a torque-proof manner to one of the inner rotor and the outer rotor and an output shaft connected in a torque-proof manner to the other of the inner rotor and the outer rotor;
   a sealing body configured as a pot including a pot base and a pot collar, the pot collar arranged radially between the inner rotor and the outer rotor; and
   wherein the pot collar of the sealing body extends axially away from the pot base into a radially outwardly projecting flange section for coupling to a flow machine configured to be drive-connected to the output shaft.

9. The device according to claim 8, wherein the drive shaft is drive-connected to a transmission unit for reducing a rotational speed of the output shaft.

10. The device according to claim 1, wherein:
    the at least one inner-rotor magnet further includes a plurality of inner-rotor magnets having the diametric magnetization arranged circumferentially on the inner rotor with alternating magnetic poles along the direction of rotation; and
    the plurality of inner-rotor magnets have a respective direction of magnetization such that the respective direction of magnetization of adjacent inner-rotor magnets of the plurality of inner-rotor magnets define an angle α with respect to one another according to the following relationship: α=(180°/a number of pole pairs)±180°.

11. The device according to claim 10, wherein the angle α of the respective direction of magnetization of said adjacent inner-rotor magnets is ±90°.

12. The device according to claim 1, further comprising a plurality of pole pins arranged between the inner rotor and the outer rotor along the direction of rotation, wherein a number of the plurality of pole pins corresponds to the following relationship: the number of the plurality of pole pins=(a number of outer rotor pole pairs+a number of inner rotor pole pairs)/2.

13. The device according to claim 12, wherein the at least two inner-rotor magnets includes four inner-rotor magnets, the at least two outer-rotor magnets includes six outer-rotor magnets, and the plurality of pole pins includes five pole pins.

14. A drive system, comprising:
a device for transmitting rotational motions without contact, the device including:
an inner rotor including at least one inner-rotor magnet having at least one of a diametric magnetization, a radial magnetization, and a lateral magnetization;
an outer rotor including at least one outer-rotor magnet and magnetically coupled to the inner rotor, the at least one outer-rotor magnet having a different type of magnetization then the at least one inner-rotor magnet;
the inner rotor and the outer rotor rotatable along a direction of rotation about a common axis of rotation;
a drive shaft connected in a torque-proof manner to one of the inner rotor and the outer rotor;
an output shaft connected in a torque-proof manner to the other of the inner rotor and the outer rotor;
a sealing body having a pot shape including a pot base and a pot collar, the pot collar arranged radially between the inner rotor and the outer rotor, and the pot collar extending axially away from the pot base into a radially outwardly projecting flange section;
wherein the at least one inner-rotor magnet includes at least two inner-rotor magnets arranged circumferentially along the direction of rotation on the inner rotor each having a diametric magnetization and a respective direction of magnetization differing from one another, and the at least one outer-rotor magnet includes at least two outer-rotor magnets each having a lateral magnetization and a respective direction of magnetization differing from one another, that at least two outer-rotor magnets arranged circumferentially along the direction of rotation on the outer rotor such that a polarity of adjacent outer-rotor magnets of the at least two outer-rotor magnets alternate in the direction of rotation;
a flow machine drive-connected to the output shaft of the device;
wherein the sealing body is couplable to a housing of the flow machine via the flange section; and
wherein the at least two outer-rotor magnets include a plurality of single pole unitary outer-rotor magnets structured and arranged directly adjacent to one another with alternating polarity along the direction of rotation such that a magnetic south pole magnet of the plurality of single pole unitary outer-rotor magnets is disposed between and directly contacts two circumferentially adjacent magnetic north pole magnets of the plurality of single pole unitary outer-rotor magnets, and wherein the lateral magnetization of the plurality of single pole unitary outer-rotor magnets defines magnetic field lines extending circumferentially to the common axis of rotation such that the magnetic field lines extend from the magnetic south pole magnet to each of the two circumferentially adjacent magnetic north pole magnets.

15. The drive system according to claim 14, further comprising a transmission unit, wherein the drive shaft is drive-connected to the transmission unit for reducing a rotational speed of the output shaft.

16. The drive system according to claim 14, wherein at least one of the at least one inner-rotor magnet and the at least one outer-rotor magnet is structured as a ring magnet.

17. The drive system according to claim 14, wherein the device further includes at least two pole pins arranged between the inner rotor and the outer rotor along the direction of rotation.

18. The drive system according to claim 14, wherein the at least two inner-rotor magnet includes a plurality of diametrically magnetized inner-rotor magnets with alternating polarity arranged directly adjacent to and directly contacting one another on the inner rotor along the direction of rotation.

19. The drive system according to claim 14, wherein the at least two inner-rotor magnets include a plurality of single unitary inner-rotor magnets structured and arranged directly adjacent to one another with alternating polarity along the direction of rotation such that a magnetic south pole end of each of the plurality of single unitary inner-rotor magnets is disposed between and directly contacts a magnetic north pole end of two circumferentially adjacent magnets of the plurality of single unitary inner-rotor magnets, and wherein the diametric magnetization of each of the plurality of single unitary inner-rotor magnets defines magnetic field lines extending parallel to one another in a plane perpendicular to the common axis of rotation.

* * * * *